United States Patent [19]

Bakka

[11] Patent Number: 4,939,720
[45] Date of Patent: Jul. 3, 1990

[54] UNIT FOR SWITCHING DATA TRANSMITTED BY ASYNCHRONOUS TIME-DIVISION MULTIPLEXING

[75] Inventor: Raymond Bakka, Meudon, France

[73] Assignee: Alcatel Cit, Paris, France

[21] Appl. No.: 277,599

[22] Filed: Nov. 28, 1988

[30] Foreign Application Priority Data

Nov. 27, 1987 [FR] France .................. 8716475

[51] Int. Cl.$^5$ ........................................... H04Q 11/04
[52] U.S. Cl. ............................................................ 370/60
[58] Field of Search ................... 370/60, 94, 68, 58, 370/66, 67, 91

[56] References Cited

U.S. PATENT DOCUMENTS

| | | | |
|---|---|---|---|
| 3,979,733 | 9/1976 | Fraser | 370/60 |
| 4,312,063 | 1/1982 | Warner | 370/68 |
| 4,491,945 | 1/1986 | Turner | 370/60 |
| 4,520,479 | 5/1985 | Grima et al. | 370/68 |
| 4,566,095 | 1/1986 | Devault et al. | 370/60 |
| 4,603,416 | 7/1986 | Servel et al. | 370/60 |
| 4,703,477 | 10/1987 | Adelmann et al. | 370/94 |
| 4,759,012 | 7/1988 | Suzuki | 370/68 |
| 4,788,679 | 11/1988 | Kataoka et al. | 370/60 |

FOREIGN PATENT DOCUMENTS

| | | |
|---|---|---|
| 0025225 | 3/1982 | European Pat. Off. . |
| 0126196 | 1/1986 | European Pat. Off. . |
| 0230847 | 8/1987 | European Pat. Off. . |
| 0300876 | 1/1989 | European Pat. Off. . |
| 2310052 | 4/1975 | France . |
| 2526613 | 11/1983 | France . |
| 84/00265 | 1/1984 | PCT Int'l Appl. . |
| 86/03642 | 6/1986 | PCT Int'l Appl. . |

OTHER PUBLICATIONS

Proceedings Computer Networking Symposium, S. Nojima et al., "High Speed Packet Switching Network for Multi-Media Information", pp. 141-150, IEEE, Washington, D.C. Nov. 17-18, 1986.
English Language Equivalent of EP 0 300 876 as filed in Australia (AU 1979388).

*Primary Examiner*—Douglas W. Olms
*Assistant Examiner*—Alpus H. Hsu
*Attorney, Agent, or Firm*—Sughrue, Mion, Zinn, Macpeak & Seas

[57] ABSTRACT

The invention concerns a unit for switching data transmitted by asynchronous time-division multiplexing comprising receive circuits (CRl/i) supplying cells received via input links, transmit circuits (CTl/j) transmitting retransmitted cells on output links, a buffer memory (MT) storing the received cells and delivering the cells to be retransmitted and a buffer memory addressing device (SMT) including a write address source (SAE) and a read address source (fsl/j).

The switching unit further comprises a write disabling circuit (pi) conditioned by a signal (adl) derived from the content of at least one received cell or a signal (tle) derived from the absence of any received cell and supplying a disabling signal (spi) and the address source includes a disabling device (pac, pal) influenced by the disabling signal (spi) so that no memory location is then occupied in the buffer memory (MT).

13 Claims, 5 Drawing Sheets

UNIT FOR SWITCHING DATA TRANSMITTED BY ASYNCHRONOUS TIME-DIVISION MULTIPLEXING

This application relates to application Ser. No. 07/276,755 to Raymond Bakka entitled "A MANAGEMENT UNIT FOR A UNIT FOR SWITCHING DATA TRANSMITTED BY ASYNCHRONOUS TIME-DIVISION MULTIPLEXING" filed Nov. 28, 1988, and assigned to the common corporate Assignee.

BACKGROUND OF THE INVENTION

The present invention concerns a unit for switching data transmitted by asynchronous time-division multiplexing known as an ATD (Asynchronous Time Division) switching matrix. In this context the term "data" is to be understood in its widest sense encompassing information comprising speech, pictures and all kinds of data in the usual sense to be transmitted and switched through the integrated services digital network (ISDN).

In asynchronous time-division (ATD) transmission as understood in this context the transmission medium of a transmission link is temporally divided into equal intervals each conveying one cell, meaning a group comprising a specific number of binary information units or bits, including a label containing a destination indication and a data field containing the communication information proper. The data rates of the tranmission link in current projects is in the order of several 100 megabits per second.

Switching consists of receiving digital information structured in this way from several input links and retransmitting the information on several output links. To be more precise, a cell received on one of the input links is retransmitted on one of the output links as designated by the destination indication contained in the cell.

A switching unit is a unitary device implementing switching of this kind between a defined number of input links and a defined number of output links. Switching units of this kind may be combined into a multistage switching network. In this case the destination indication must meet the requirements of each of the switching units passed through.

At a switching unit and in a stationary switching state the cells from one input link intended for the same output link constitute a data stream the average data rate of which is constant but the instantaneous data rate of which is subject to fluctuations that may be regarded as random. The cells retransmitted on an output link originate from several input links and represent the addition of several independent streams. The network control means must be such that the average data rate corresponding to this addition is at most equal to the transmission capacity of the output link if congestion is to be avoided. For reasons of efficiency, however, this average total data rate must also be able to approach as closely as possible the nominal transmission capacity of the link. This means that the sum of the instantaneous data rates will from time to time exceed the transmission capacity of the output link. Outside these peak periods this capacity will not be fully utilized.

Within a switching unit the foregoing considerations lead to the provision of a buffer memory receiving the cells from the input links and storing them until they can be retransmitted on the output links.

A switching unit meeting the requirement as just defined is the subject of the French Pat. No. 2 538 976.

This describes a switching unit for data transmitted by ATD multiplexing comprising receive circuits each associated with an input link and supplying cells received by that input link, transmit circuits each associated with an output link and sending retransmitted cells on that output link, a buffer memory storing received cells supplied by the receive circuits and delivering cells to be retransmitted to the transmit circuits, and a buffer memory addressing device including a write address source and a read address source.

The received cells appear on a bus leading to the buffer memory into which the received cells from the various input links are written cyclically. In parallel with this the label of each cell is analyzed by means of a control memory and supplies the address of the output link for which the cell is intended. This address designates a "first in-first out" (FIFO) memory associated with the output link. It makes it possible to write into the latter the address of the buffer memory location in which the cell in question has been written. The output FIFO memory of each output link therefore indicates where the cells to be retransmitted on that output link are to be read out from the buffer memory.

The buffer memory is addressed in a cyclical way, as explained above, to write into it the received cells on the input links of the switching unit; a timebase supplies the addresses of the write locations in the buffer memory one after the other and the cells arriving in succession on the input links are written in order into those locations. It is just as if the buffer memory were subdivided into as many memory parts as there are input links. The number of memory locations in each part is the same for all the input links. Given the conditions as explained hereinabove, this number must be such as to meet the writing requirements specific to the most heavily loaded input links.

SUMMARY OF THE INVENTION

The present invention is directed to improving the efficiency with which the buffer memory is used in a switching unit of the type that has just been described, which will make it possible either to reduce the size or to improve the performance of the switching units.

The invention is based on the fact that among the cells transmitted on an output link, which is also an input link of a later switching stage, there are cells that must not or cannot be retransmitted. Most of these are "empty" cells. As already explained, outside peak periods the nominal transmission capacity for an output link is not filled by the sum of the data streams applied to it. There are therefore cells for which, initially, there is no communication information available. These cells are then filled with a configuration of bits which is highly unlikely to be reproduced by any communication cell. The benefit of transmitting empty cells of this kind is that it enables synchronization of the receive circuit with regard to the temporal subdivision into separate time intervals.

The invention is therefore characterized in that the switching unit comprises a write disabling circuit conditioned by the contents of a receive cell or by the absence of any receive cell and supplying a disabling signal and in that the address source includes a disable port conditioned by said disabling signal whereby no memory location is then occupied in the buffer memory.

The address source may be a counter supplying the successive writing addresses in the buffer memory and the disabling circuits will then prevent incrementing of the counter, avoiding the use of a write location in the buffer memory.

The address source may include a memory storing addresses of buffer memory locations released by cells already retransmitted. The disabling signal will then prevent the reading of an address in this address store, which will advantageously be an FIFO memory.

Cells not to be retransmitted will be identified in particular by a circuit for decoding the address part of the label. Identification may also be done by the receive circuit where it does not have any communication cell to supply, because it has received an empty cell or because a received cell is not ready at the time it should supply one or because the receive circuit is not functioning normally (desynchronized or out of order, for example).

The invention also applies if the routing is of the self-directed type, in which case the label of each cell to be routed includes destination indications for each of the switching units to be passed through, or the virtual circuit type, in which case the destination indication included in the label of each cell to be routed has to be translated in each switching unit passed through.

BRIEF DESCRIPTION OF THE DRAWING

The various objects and characteristics of the invention will be explained in the following description which is given by way of non-limiting example only and with reference to the appended figures in which.

DESCRIPTION OF THE PREFERRED EMBODIMENTS

Figure 1:
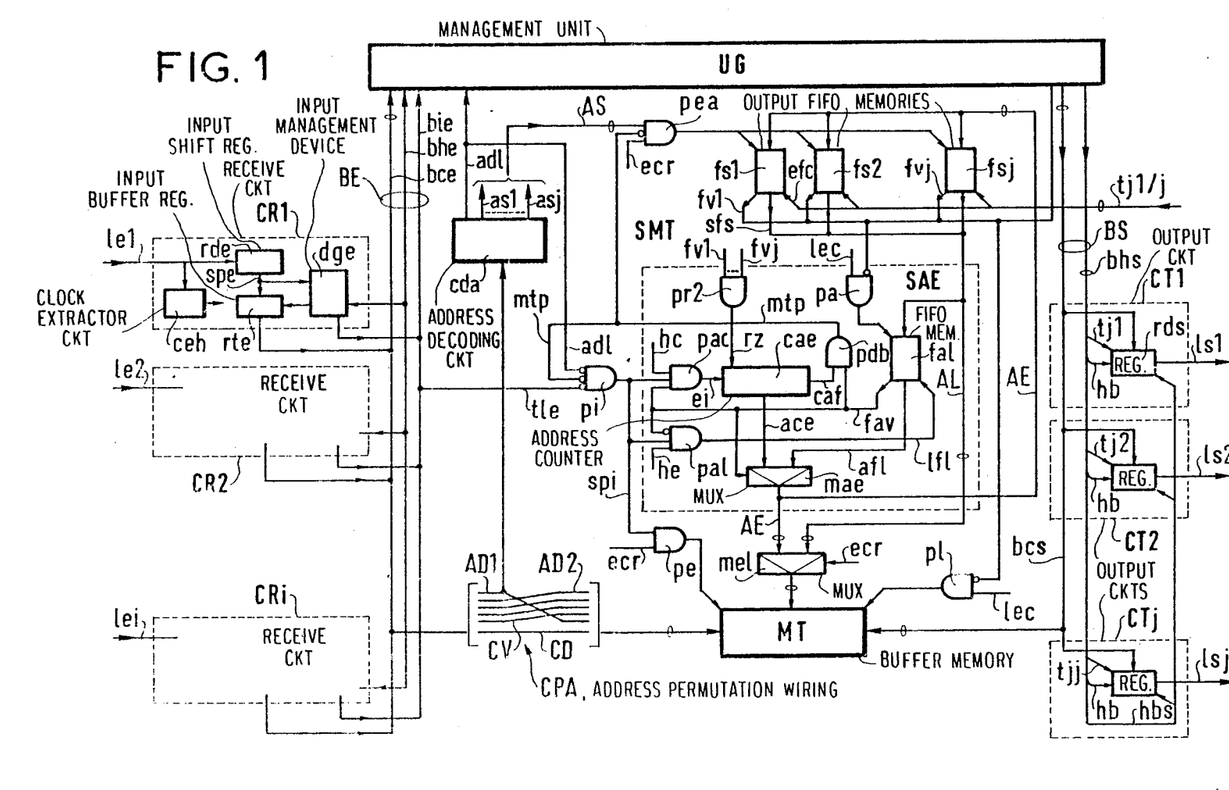
FIG. 1 is a simplified diagram of one embodiment of the switching unit in accordance with the invention.

FIG. 1 is a simplified diagram of one embodiment of the switching unit in accordance with the invention, that is to say an ATD switching matrix, in the case of self-directed type routing.

This matrix includes i similar receive circuits CR1 through CRi to each of which is connected one of i inputs links le1 through lei. The circuit CR1 is shown in simplified form and the circuits CR2 and CRi are shown in symbolic form, to avoid overcomplicating the diagram.

The receive circuit CR1 includes a clock extractor circuit ceh which produces a clock signal synchronized with the signals received on the link le1 and makes it possible, among other things, to detect the digital signals present on the link le1 in order to feed them serially into an input shift register rde. This input shift register is capable of holding an entire transmission cell and of supplying it in parallel from its output spe to an input buffer register rte which may be of the FIFO type. The receive circuit CR1 also includes an input management device dge which receives the cells provided in parallel at the output of the register rde which controls the input buffer register rte and which, among other things, enables it to be read. To this end the management device dge is connected to an input clock bus bhe which supplies it with control signals and to an input information bus bie over which it supplies information signals. The input buffer register rte is connected to an input cell bus bce.

The three buses bhe, bie and bce together constitute the input bus BE. The bus BE is temporally shared between the receive circuits in a cycle CE the duration of which is at most that required to transmit one cell over the input links and which includes i equal periods ti individually referenced ti1 through tii (see FIG. 3), one for each of the receive circuits CR1 through CRi.

The functions of the management device dge include that of recognizing the periods in which no cell is applied by the receive circuit CR1 to the bus bce and to signal them as being of this kind by applying a free time signal to the line tle of the bus bhe.

The buffer memory system SMT therefore receives in each period ti either a cell CL received from a received circuit CR or a free time signal tle.

Figure 2:
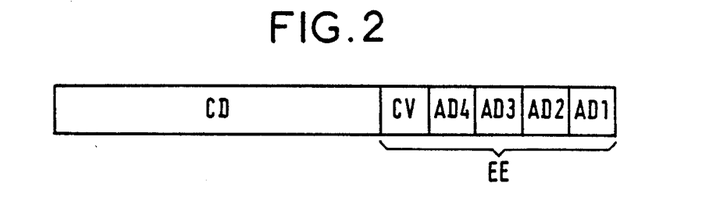
FIG. 2 shows the format of a cell.

FIG. 2 shows the format of a cell CL. The cell comprises a data field CD and a label EE comprising, for example, four addresses AD1 through AD4 and an assignment number CV. The data field may comprise 32 bytes. The first address AD1 is that which is to provide a destination indication to the matrix in question. The subsequent addresses are to be used in the matrices through which the cell in question will pass subsequently. The assignment number CV has a similar role in relation to the network terminal equipment which will ultimately receive the cell and have to route it. As the matrices of a network are all similar, each has to receive a destination indication given by the first address of the label EE of the cell that it receives. For this to be so, the present matrix comprises address permutation wiring CPA between the bus bce and the buffer memory MT by means of which the address AD1 goes to the last position in the label EE and the addresses AD2 through AD4 and CV move forward one position. After retransmission of the cell the address AD2 will therefore be the address AD1 for a matrix of the next stage of a network of matrices such as that of FIG. 1.

As can be seen in FIG. 1, the address AD1 is transmitted to an address decoding circuit cda. This responds by supplying a signal on one of j output address lines AS individually referenced as1 through asj if the cell has to be retransmitted and this then identifies the output link on which it must be retransmitted. In the case of a cell which does not have to be retransmitted, for example in the case of a cell addressed to the management unit UG of this matrix, the decoding circuit supplies instead a signal on the line adl.

It will initially be assumed that the received cell CL is a communication cell that has to be retransmitted on one of the output links ls1 through lsj. The address decoding circuit cda therefore supplies a signal on the line asj, for example. It does not supply the signal adl. The signal tle is also absent.

It will also be assumed that a signal mtp is absent, which is true provided that the buffer memory is able to store an input cell, as will be seen later.

It is necessary to point out here that in the present text and for reasons of simplification the same reference is often used for a line and for the signal that it carries.

The consequence of what has been explained above is that the disabling gate pi supplies a signal spi enabling the gates pal and pac whereby a new write address source SAE write address is obtained. The write address source SAE essentially comprises an address memory fal, advantageously of the FIFO type, containing the addresses of write locations in the buffer memory MT which have just been released after use and an address counter cae having as many useful count states as the buffer comprises memory locations and which is incremented from one state to the next until it reaches a stop state in which it supplies a signal caf; all this will be explained later.

Provided that at least one address is stored in the FIFO memory fal, an output of this FIFO memory supplies a null level signal on a line fav which opens the gate pal and closes a gate pdb which then supplies a null signal opening the gate pi and the gate pea.

In the address obtaining time interval characterized by a signal hc situated at the beginning of the period ti (see FIG. 3) the gate pal is open and supplies a signal lfl to the FIFO address memory fal instigating in the latter a read operation which delivers the address of a free location in the buffer memory MT on the lines afl. This address is fed to a multiplexer mae which also receives the null level signal on the line fav. The multiplexer mae responds by supplying the address AE.

The time interval in which the buffer memory MT is written is characterized by a signal ecr situated at the end of the period ti (see FIG. 3) and fed to a write/read address mutliplexer mel to switch it to the write address source SAE; this supplies the address AE to the buffer memory MT.

At the same time the write control gate pe, also enabled by the output signal spi from the gate pi, transmits the signal ecr to the buffer memory MT in which a write operation is then performed. The cell present on the bus BE, as modified by the permutation wiring CPA, is written into a free location designated by the address AE.

Also, the same write signal ecr opens the gates pea so that the one which receives the signal asj from the decoding circuit cda supplies a write control signal to one of the j output FIFO memories fs1 through fsj each associated with a, respective output link ls1 through lsj. The FIFO memory which corresponds to the output link for which the received cell is intended therefore receives the address AE of the location at which the cell is stored in the buffer memory MT, applied to the input of all the FIFO fs1 through fsj; it stores it for future retransmission of the cell in question on the corresponding output link.

The process as just described is reproduced in each period ti for successive receive circuits provided that the latter supply cells CL to be retransmitted and that the FIFO address memory fal contains at least one available buffer memory location address.

If the FIFO address memory fal does not contain any further address the level of the signal fav changes which closes the gate pal and opens the gate pac. It will be assumed that at this time the address counter cae has not reached the stop state in which it supplies the signal caf. Because of this the gate pdb supplies a null level signal mtp, as previously.

When the signal fav is high, the multiplexer mae is switched to the output ace of the counter cae. It is therefore the address supplied by the counter cae that will be used to constitute the address AE instead of the address supplied by the FIFO address memory fal. As previously, this address is used to write the incoming cell into the buffer memory MT. It is also written into the output FIFO memory fs1 through fsj corresponding to the output link for which this cell is intended.

The signal hc is then retransmitted by the gate pac to an indexing input ei of the write address counter cae which is incremented by one step and supplies an address increased by one unit on its output ace, anticipating the writing of the next cell, unless it reaches the stop state.

This explains how the communication cells that have to be retransmitted are written into the buffer memory while the addresses of the memory locations which contain them are written into the output FIFO.

It is also necessary to consider the case where no address is available for writing in the buffer memory. This is the case when the FIFO address memory fal supplies the signal fav and the counter cae supplies the signal caf. The gate pdb responds by supplying the signal mtp which closes the gate pi and the gate pea. An incoming cell which cannot be written into the buffer memory is therefore treated as an empty cell. Its content is lost, which is inevitable, but this does not disrupt the operations in progress.

A way must be provided for the counter cae to leave its stop state from time to time. This can be achieved as shown in FIG. 1, for example, using an AND gate pr2 which supplies a signal rz if all the output FIFO memories fs1 to fsj are empty and respectively supply the signals fv1 through fvj. This signal (rz) reinitializes the counter cae after which it will supply the successive addresses of all the memory locations of the buffer memory MT as and when needed, in the manner previously described. The same signal can also reinitialize FIFO address memory fal or ensure in some other way that the addresses which it contained are not used.

The case of a cell that is not to be retransmitted will now be considered. This case will first be illustrated by the reception of a cell intended for the management unit UG. This cell carries an address AD1 which when decoded by the decoding circuit cda causes a signal to be applied to the line adl, no signal being provided on the lines AS, on the other hand.

The bus BE is extended as far as the management unit UG. The line adl is also extended as far as the management unit UG. The decoding signal applied to this line will therefore invite the management unit UG to take notice of the information present on the bus BE. This procures the advantage that the management unit UG will only be called on to take notice of cells addressed to it, which will minimize its workload.

A second case, actually similar to the previous one, results from the reception of an "empty" cell by a receive circuit CR. For example, the matrix of the switching stage on the upstream side of the present matrix has no information to transmit in the cell to be transmitted on the link le1 to the receive circuit CR1. It therefore sends an empty cell, as explained in the preamble to this description. The empty cell is identified by the mangement device dge when it is shown at the output spe of the register rde. This cell is not then transferred into the input buffer register rte. The result a little later, during a period of the bus BE assigned to the link le1, is that the register rte is empty; no cell is supplied on the bus bce and the management device dge delivers a signal tle on the bus bie. This signal notifies the management unit of this fact.

In the two typical cases that have just been described there is no need to prepare for retransmission of a receive cell. The invention therefore provides means of not occupying-uselessly-a location in the buffer memory MT. In practice there are various ways to achieve this result, depending on the configuration of the buffer memory addressing circuit. The simplest, which is that employed in this embodiment, is to disable operations relating to writing a cell into the buffer memory.

To this end the gate pi is closed by one or other of the signals adl and tle and supplies a disabling signal spi on the disabling ports of the gates pac and pal so that these two gates are closed. Because these gates remain closed the FIFO address memory fal cannot be read and the counter cae cannot advance. Also, the disabling signal spi closes the gate pe so that the write operation will not take place in the buffer memory MT. Furthermore, the address decoding circuit cda does not supply any signal on the lines AS and therefore no adddress AE will be stored in the output FIFO memories fs1 through fsj.

This avoids occupying an unnecessary location in the buffer memory MT so that the efficiency of the switching unit is increased (if the memory capacity is unchanged relative to the prior art methods) or the capacity of the buffer memory is reduced (for equal performance).

What is more, as no address is written into the output FIFO this will sooner or later result in the sending of an empty cell, as will emerge later.

Consideration will now be given as to how the stored cells are retransmitted on the output links.

Figure 3:
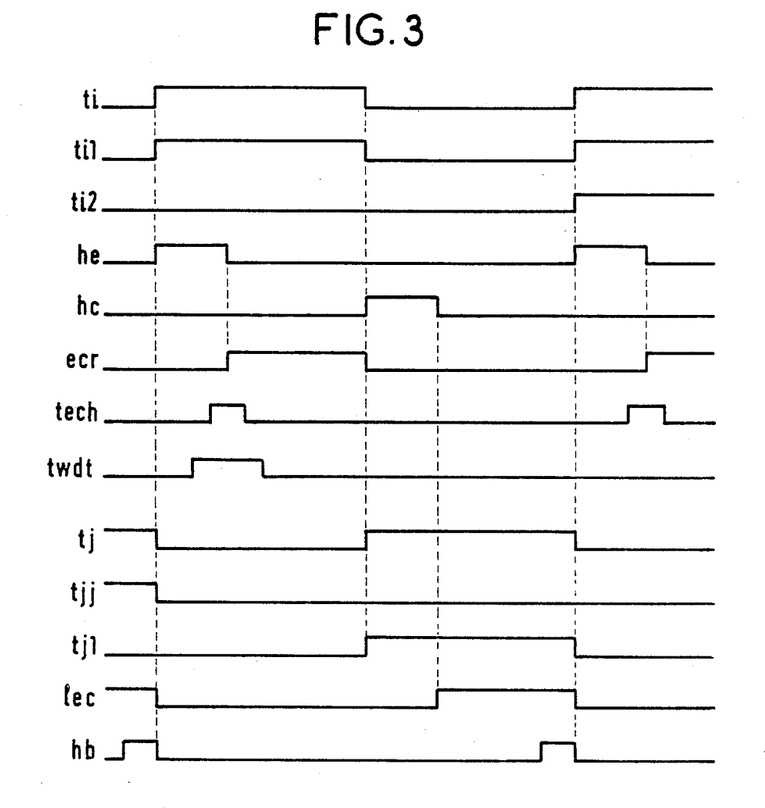
FIG. 3 shows the waveforms of the various timebase signals used in the switching units in accordance with the invention.

Each of the output links ls1 through lsj is provided with an output circuit ct1 through ctj which is equivalent to a parallel-serial conversion register rds. These output circuits CT are connected to a bus BS temporally shared between all the output circuits in a cycle CS the duration of which is that to transmit a cell on the output link and which comprises equal periods tj, individually referenced tj1 through tjj (FIG. 3). This bus BS, similar to the input bus BE, comprises an output cell bus bcs and an output clock bus bhs. During a period defined by a signal tj which is specific to it an output circuit (CT1, for example) loads into its register rds the cell then present on the bus bcs, under the control of the clock signal hs (see FIG. 3). From this time, and in response to clock pulses hbs, the entire cell is transferred serially from the register rds over the link ls1. The same applies for the other output links.

Cells are supplied to each of the output links by reading them in the buffer memory MT, provided that there are cells to be retransmitted.

At the beginning of a period tj one of the output FIFO memories fs1 through fsj (fs1, for example), receiving a signal tj1 specific to it on its read control input efc, supplies a read address AL. Given the way in which an FIFO memory functions, this is the address of the location containing the cell in the buffer memory MT which has been waiting longest to be retransmitted on the link ls1. At the same time the FIFO memory fs1 supplies a null level signal on its output fv1 which signifies that it is not empty. Applied to an inverting input of the read gate pl, this signal enables transmission of a read control signal lec to the buffer memory MT to command in it the execution of a read operation. The address AL for this operation is that provided by the FIFO memory fs1 on its output sfs, the write/read address multiplexer mel being switched to this output because the signal ecr is absent. The cell which is therefore read is transmitted by the buffer memory MT on the bus bcs. From there, under the control of a clock signal hs, it is written into the register rds of the transmit circuit CT1.

At the same time, the address AL supplied by the output FIFO memory fs1 on its output sfs is supplied to the input of the FIFO address memory fal which also receives a write control signal from the gate pa opened by the null level on the line fv1 and therefore passing the signal lec. This address, corresponding to a location being read and therefore being released in the buffer memory MT, is therefore stored in the FIFO address memory fal to be re-used, as already described.

The process that has just been described is reproduced in a similar way in each period tj for the successive output links provided that cells to be retransmitted are supplied by the memory MT.

Consideration will now be given to the case where there is no cell to be retransmitted. Taking up again the example of the link ls1 and its output FIFO address mem fs1, there is no longer any address in this FIFO memory and it therefore supplies a signal fv1 indicating that it is empty.

The signal fv1 closes the gate pl and therefore prohibits any read operation in the buffer memory MT. It also closes the gate pa and prevents any write operation in the FIFO address memory fal. Also, it is transmitted to the management unit UG to tell it that the switching matrix does not have any cell to transmit on the output link in question. In return the management unit UG supplies on the bus bcs the information that characterizes an empty cell, for example.

Like the bus BE, the bus BS is extended as far as the management unit UG which enables it to transmit service cells on the output links if there is no communication cell to be retransmitted. The empty cell is therefore one of these service cells, so to speak.

The empty cell transmitted by the management unit UG on the bus bcs is routed by the output circuit CT1 on the output link ls1 in just the same way as a communication cell from the buffer memory MT.

The switching unit, that has just been described could omit the FIFO address memory fal and the address counter cae would then have to supply cyclically all the addresses of the buffer memory MT for storing the received communication cells. As compared with the known solution mentioned in the preamble, the fact that only the communication cells to be retransmitted are stored in the buffer memory MT procures the two-fold advantage that unnecessary occupation of memory locations is avoided and the data rates of all the input links are mixed so that, statistically, the maximum data rate of the set of i input links is less than i times the maximum data rate of a link, with regard to the requirements for writing in the buffer memory.

The introduction of the released addresses into FIFO address memory fal makes it possible to re-use the locations of the buffer memory MT as soon as they are released. In each period tj it receives a released address unless the output FIFO memory is empty. In each period ti it supplies an address unless there is no cell to be stored. As the periods ti and tj have the same duration the average content of the FIFO address memory fal is constant. However, an increase in the input data rate or a reduction in the output data rate not only calls for additional locations in the buffer memory MT but also requests the addresses for such locations from the address source SAE. The released addresses FIFO memory fal can be large enough to contain all the released addresses. These addresses were previously supplied by the address counter cae. Eventually the FIFO memory will be empty at a time when the counter cae will have already given out all the addresses of the buffer memory MT. At this time all locations of the buffer memory MT will be occupied. The address source being unable to supply any further addresses, the cell presenting at this time will be refused, which is inevitable in the given circumstances. It might be preferable to store the incoming cell anyway and therefore lose a cell already, stored in the buffer memory, belonging to another cell; to achieve this it would suffice for the address counter to function cyclically. In the latter case the FIFO address memory fal could be made smaller; then recourse to the counter cae would be more frequent but some locations in the memory, the addresses of which would not have been retained by the FIFO address memory fal (full at the time they were released), could be designated by the counter cae. A solution of this kind might be acceptable if such events occurred rarely.

The description of the embodiment shown in FIG. 1 will now be completed. The various cyclic control signals will be generated by a timebase, as is standard practice in this technique. Their timing is outside the scope of this description. They are shown in FIG. 3. The various components in the FIG. 1 diagram are of conventional types.

It therefore remains only to describe in more detail one embodiment (shown in FIG. 4) of the receive circuit CR1 from FIG. 1 and in particular the input management device dge that it includes.

Figure 4:
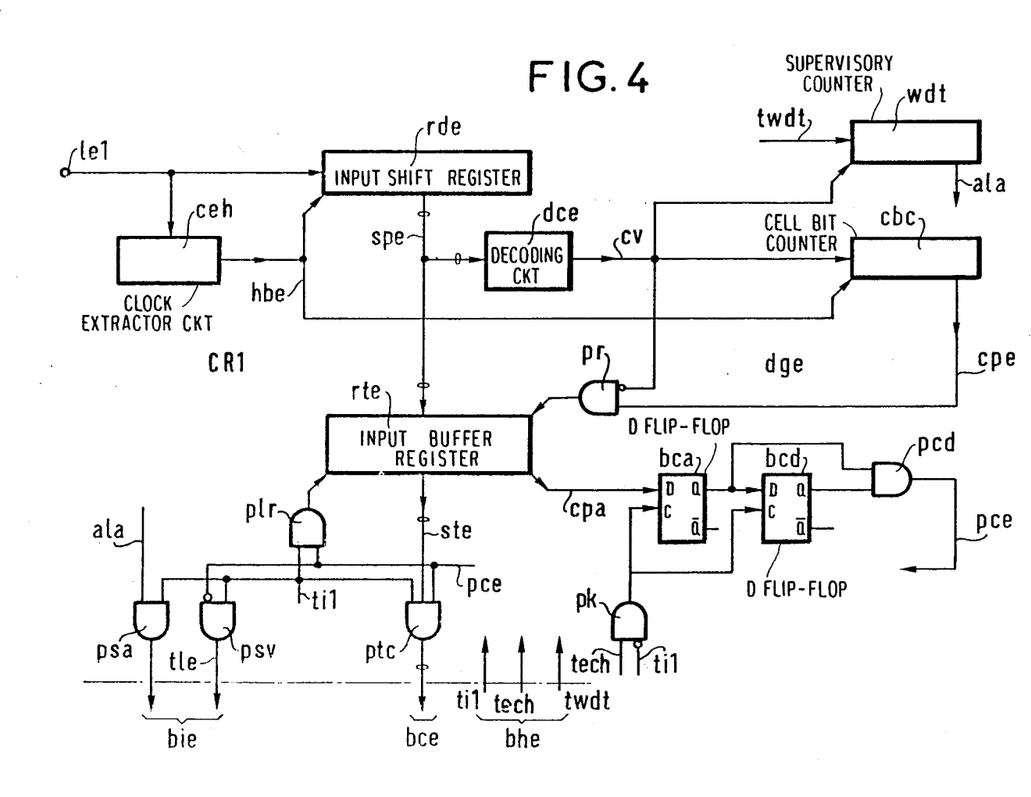
FIG. 4 is a more detailed diagram of the receive circuit CR1: from FIG. 1.

It incorporates the clock extractor circuit ceh, which can be of a conventional type, the input shift register rde and the input buffer register rte. The remainder of the equipment constitutes the management device dge.

At the output of the register rde a decoding circuit dce identifies the presence of an empty cell. This supplies a signal cv which resets to zero a supervisory counter wdt and a cell bit counter cbc. The same signal cv closes the gate pr to prevent transfer of the empty cell in the buffer register rte.

During reception of a subsequent cell (a communication cell, for example) the bit clock pulses hbe not only enter the cell into the register rde but also increment the counter cbc. On the last bit of the cell the counter cbc supplies a signal cpe. As this is not an empty cell the gate pr is open and the signal cpe commands loading into the input buffer register rte of a complete cell present at the output spe of the register rde.

This process is repeated as each cell is received provided that it is not an empty cell.

At periodic intervals (once per cycle of the bus BE, for example) a timebase pulse twdt is received on the input clock bus bhe. It increments the supervisory counter wdt by one step.

Should no empty cell be received for a predetermined time interval the counter wdt would reach a state in which it supplies a signal ala to give the alert.

During the period ti specific to the receive circuit CR1 in question the input clock bus bhe supplies a signal ti1. In each period ti it also supplies a signal tech. Outside the period ti of the circuit CR1 the gate pk is opened by the signal ti1. It passes the signal tech which is then applied to the clock input C of two D-type flip-flops bca and bcd. If at least one cell is waiting in the input buffer register rte the latter supplies a signal on its output cpa which causes the flip-flop bca to go to "1" on receiving the signal tech. It then supplies a signal on its Q output which causes the flip-flop bcd to go "1" on the next pulse tech. The gate pcd is then open and supplies a signal pce.

At the beginning of the period ti specific to the receive circuit CR1 the signal ti1 opens the gates psa and psv. The former transmits over the bus bie the signal ala characterizing the prolonged absence of empty cells, addressed to the mangement unit UG. The latter transmits in inverted form the signal pce indicating the presence of an available cell in the register rte. It therefore supplies the signal tle when no cell is available.

Also, the gate plr is opened by the signals ti1 and pce and commands a read of the input buffer register rte which supplies on its output ste the cell which is retransmitted on the bus bce by the multiple gate ptc opened by the signals ti1 and pce.

It is therefore clear that the reception of an empty cell which is not written into the input buffer register rte has the effect, later on, that the register rte no longer has any cell to supply on the bus bce which is detected between two signals ti1 by the flip-flops bca and bcd; then, instead of supplying a cell on the bus bce, the receive circuit CR1 supplies a signal on the line tle.

Figure 5:
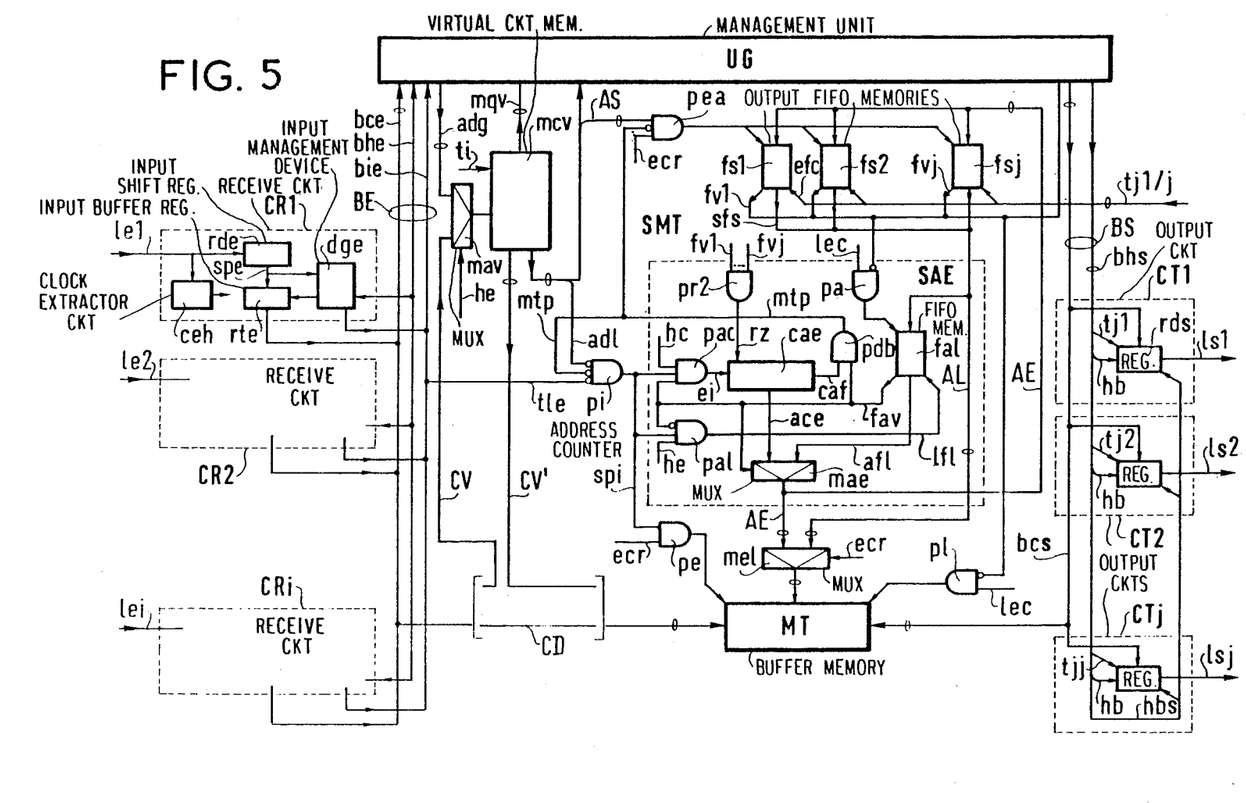
FIG. 5 is a diagram showing an alternative embodiment of the switching unit to that of FIG. 1.

Turning to FIG. 5, it will now be shown that the invention is equally applicable to the case of virtual circuit routing. In this case, as compared with the format from FIG. 2, the label of each cell comprises only the virtual circuit number CV, the addresses being omitted. The diagram is the same as that of FIG. 1 except as will now be explained, and the same references have been retained for designating identical component parts.

The address decoding device is replaced by a virtual circuit memory mcv. The latter, read under the control of the signal ti in each period of the bus BE, then receives as an address the indication CV of the receive cell which is transferred to it by a multiplexer mav switched by the signal he. In exchange it supplies the signal AS if the cell has to be retransmitted or the signal adl if the cell is addressed to the management unit UG, in just the same way as the decoding circuit cda from FIG. 1. Thereafter the procedure is the same in so far as routing of the received cell is concerned.

Moreover, the permutation wiring CPA is omitted because the memory mcv supplies a modified virtual circuit indication CV' instead of that which served it as an address.

The management unit finally accesses the memory mcv via the links adg and mqv to write and read it. This will make it possible to write into it the information corresponding to each value of the indicator CV, in locations corresponding to these values, in order to have the memory mcv function as a translation table.

Figure 6:
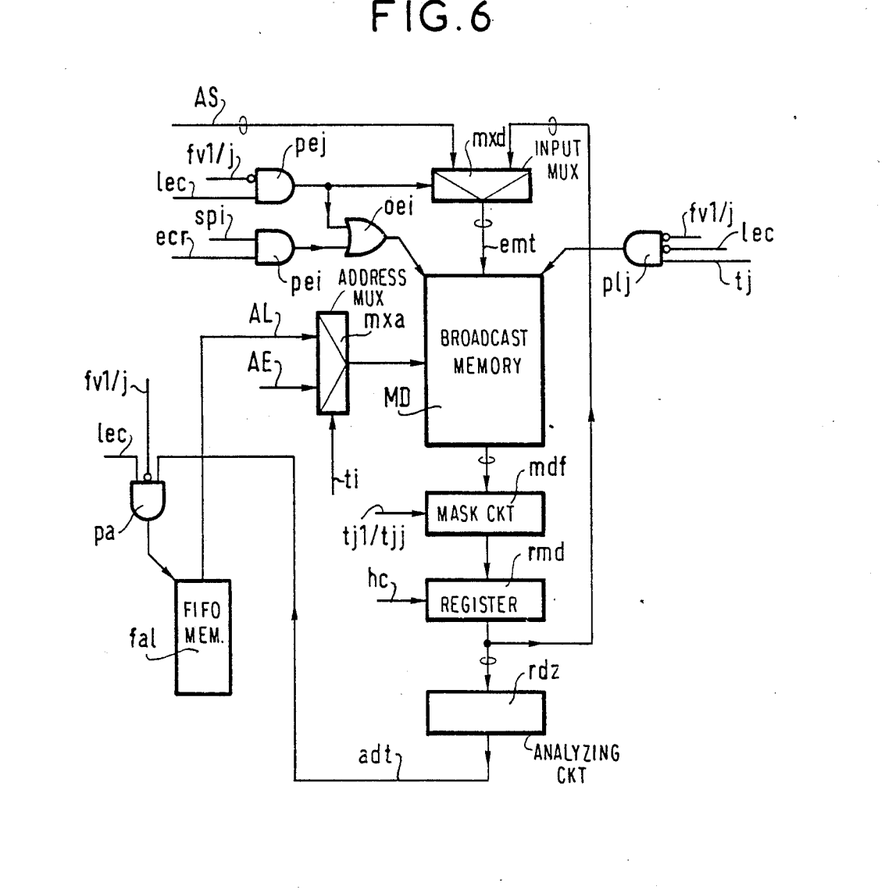
FIG. 6 is a diagram showing the additional provisions made in the case where the switching unit in accordance with the invention has to allow for broadcasting.

FIG. 6 shows additional circuitry that can be included in the data switching unit of FIG. 1 or 4 to enable broadcasting, that is to say the transmission of a cell on more than one output link. In the prior art system it is sufficient for the decoding circuit or the control memory to supply several rather than only one signal on the AS lines so that the address AE is stored not in a single output FIFO memory but several of them, so that the corresponding output links all receive the cell stored at this address. With the invention, however, the existence of a free addresses memory (the FIFO memory fal) is a problem. A buffer memory location serving as the source for a broadcast will not be free again until the cell has been sent to all the destination links.

The proposed solution, as shown in FIG. 6, consists in conditioning the writing,, of a released address AL into the FIFO memory fal by a signal adt needed to open the gate pa. This signal is supplied by an additional device essentially comprising a broadcast memory MD having a memory location for each buffer memory MT address and adapted to store one bit per output link.

A data word is written into each location of this broadcast memory MD at the same time as a cell is written into the buffer memory MT, and at the same adddress AE. The signal ti supplied to the address multiplexer mxa then switches the latter so that the broadcast memory MD receives the address AE. During the time interval of this signal ti the gate pei controlled by the signals spi and ecr (see description of FIG. 1) supplies a write control signal which commands the memory to execute a write operation via an OR gate oei. The information to be written into the memory location designated by the address AE comprises one bit per output link and it is the address (denoted AS) which the address decoding circuit, cda (see FIG. 1) supplies to the output FIFO memory and which includes one bit per output link, one specific binary value of this bit signifying that the incoming cell is to be retransmitted on the output link. In the case of a cell that is to be broadcast several information bits AS have this specific value, of course. The input multiplexer mxd is then in the appropriate condition to supply this information AS to the input of the memory MD in which it is stored at the address AE. This procedure is repeated for each of the cells received and stored in the buffer memory MT.

In each period tj, provided that the output FIFO memory interrogated does not supply any signal fv1 .. ., fvj (fv1/j for short) indicating that it is empty and therefore provided that it supplies an address AL of a location in the buffer memory containing a cell to be retransmitted, a read operation and a write operation are performed in succession in the broadcast memory MD. Both these operations are done at the address AL, absence of the signal ti switching the multiplexer mxa so that it supplies this address to the address input of the memory MD. The read instruction is given by the gate plj opened by the signal tj and absence of the signal lec (see FIG. 3). The word read is supplied by the memory MD to a mask circuit mdf which renders the signals tj1 through tjj coincident and, in the same order of correspondence, the bits of the word read in the memory. This deletes in the memory the bit which previously indicated that the cell in question was to be retransmitted on the output link in question. It takes the value opposite to said specific value. A register rmd receives the masked word at the end of the signal hc.

Rewriting follows. It is commanded by the gate pej opened by the signals fv1/j and the signal lecn supplying the write instruction via the OR gate oei and switching the multiplexer mxd to the output of the register rmd.

During this time the circuit rdz analyzes the content of the register rmd. If all the bits of the word that it contains have the value opposite to said specific value, in other words if the cell at the location designated by address AL is not to be retransmitted on any output link, the circuit rdz supplies the signal adt. This signal opens the gate pa and enables writing of the address AL into the released addresses FIFO fal.

It is obvious that the foregoing description has been given by way of non-limiting example only and that numerous variations thereon may be envisaged without departing from the scope of the invention.

I claim:

1. A unit for switching data transmitted by asynchronous time-division multiplexing comprising:
   receive circuits each associated with an input link and supplying cells received via said input link;
   transmit circuits each associated with an output link and transmitting retransmitted cells on said output link;
   a buffer memory storing received cells supplied by the receive circuit and delivering cells to be retransmitted to the transmit circuit; and
   a buffer memory addressing device for addressing said buffer memory comprising a write address source and a read address source;
   characterized in that the switching unit further comprises a write disabling circuit (pi) conditioned by a signal (adl) derived from the content of at least one of said received cells or a signal (tle) derived from the absence of any of said received cells and supplying a disabling signal (spi) to said buffer memory addressing device and in that the write address source comprises a disabling device (pac, pal) influenced by said disabling signal (spi) such that no memory location is then written in the buffer memory (MT).

2. A switching unit according to claim 1, characterized in that said write address source comprises an address counter (cae) provided with an indexing input (ei) receiving an indexing signal causing the counter to advance by one step following writing of a cell into the buffer memory and in that said disabling signal (spi) is operative on said indexing input via means (pac) of said disabling device enabling transmission of said indexing signal to be prevented.

3. A switching unit according to claim 1 characterized in that said write address source further comprises a released address memory (fal) receiving the addresses of locations of the buffer memory released by cell already retransmitted and supplying these addresses in place of an address counter (cae) of said write address source as soon as it contains at least one of them.

4. A switching unit according to claim 2 characterized in that said write address source further comprises a released address memory (fal) receiving the addresses of locations of the buffer memory released by cells already retransmitted and supplying these addressee in place of the address counter (cae) as soon as it contains at least one of them.

5. A switching unit according to claim 3 or 4 further comprising means (pal) on which said disabling signal (spi) is operative to prevent reading of an address in said released address memory (fal).

6. A switching unit according to claim 5 characterized in that the released address memory (fal) is an FIFO memory.

7. A switching unit according to claim 1 characterized in that the receive circuit of an input link comprises a cell absence identification circuit (bca, pcd, psv) which supplies a signal (tle) which is transmitted to said write disabling circuit (pi) to produce said disabling signal (spi).

8. A switching unit according to claim 1 characterized in that an address decoding circuit (cda) is provided to receive an address part (AD1) of a label field (EE) of a cell presented to the buffer memory, an ouytput (ad1) of this address decoding circuit (cda) supplying a signal in the presence of a cell that is not to be retransmitted, which signal is transmitted to said write disabling circuit (pi) to produce said disabling signal (spi).

9. A switching unit according to claim 1 in which each of the cells to be retransmitted contains several addressed (AD1, AD2, . . . ) that are to be used in the switching units passed through in succession, characterized in that an address decoding circuit (cda) decodes a first address of the received cell and supplies a decoded output address to said read address source.

10. A switching unit according to claim 9 characterized in that a cell is transferred from an input link to an output link via an address permutation circuit (CPA) which moves a second address contained in a cell to be retransmitted into a first address position.

11. A switching unit according to claim 1 characterized in that each of the cells contains a virtual circuit indication (Cv) and further comprising a virtual circuit memory (mcv) for receiving said virtual circuit indication (Cv) and supplying a decoded output address to said read address source.

12. A switching unit according to claim 11 characterized in that siad virtual circuit memory (mcv) supplies a virtual circuit indication (Cv) which replaces that which the received cell contained.

13. A switching unit according to any one of claims 3, 4, 7, 8, 9 or 11 wherein provision is made for retransmitting a received cell on more than one output link (broadcasting), characterized in that it further comprises a broadcast memory (MD) containing a memory location for each memory location of the buffer memory (MT) adapted to store a bit corresponding to each output link, writing means (mxd, pei, mxa) whereby this bit may be assigned a specific value when a cell stored in the memory location of the buffer memory (MT) is to be retransmitted on the link to which it corresponds, erasing means (mdf) whereby this bit can be assigned the opposite value when the cell in question has been retransmitted on the link to which it corresponds, and cell release means (rdz) enabling writing of the address of the cell in question into the released address memory (fal) only when all the bits of the location in question of the broadcast memory (MD) have said opposite values.

* * * * *